United States Patent
Lee et al.

(10) Patent No.: US 11,065,934 B2
(45) Date of Patent: Jul. 20, 2021

(54) HEAT PUMP SYSTEM FOR VEHICLE WITH BATTERY AND ELECTRONIC COMPONENT COOLING

(71) Applicants: Hyundai Motor Company, Seoul (KR); Kia Motors Corporation, Seoul (KR)

(72) Inventors: Kilwoo Lee, Seoul (KR); Dong Seok Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 364 days.

(21) Appl. No.: 16/161,426

(22) Filed: Oct. 16, 2018

(65) Prior Publication Data

US 2019/0381857 A1 Dec. 19, 2019

(30) Foreign Application Priority Data

Jun. 15, 2018 (KR) .......................... 10-2018-0069001

(51) Int. Cl.
*B60H 1/00* (2006.01)
*H01M 10/625* (2014.01)
*B60L 58/26* (2019.01)

(52) U.S. Cl.
CPC ..... *B60H 1/00278* (2013.01); *B60H 1/00328* (2013.01); *B60H 1/00385* (2013.01);
(Continued)

(58) Field of Classification Search
CPC ............ B60H 1/00278; B60H 1/00899; B60H 1/143; B60H 1/2221; B60H 1/00385;
(Continued)

(56) References Cited

U.S. PATENT DOCUMENTS

| 6,047,770 A * | 4/2000 | Suzuki | B60L 1/003 165/202 |
| 8,402,776 B2 * | 3/2013 | Johnston | B60L 58/18 62/79 |

(Continued)

FOREIGN PATENT DOCUMENTS

| JP | 5488185 B2 | 5/2014 |
| KR | 10-1811762 B1 | 12/2017 |
| KR | 10-1817729 B1 | 1/2018 |

*Primary Examiner* — Frantz F Jules
*Assistant Examiner* — Lionel Nouketcha
(74) *Attorney, Agent, or Firm* — Mintz Levin Cohn Ferris Glovsky and Popeo, P.C.; Peter F. Corless

(57) ABSTRACT

A heat pump system for a vehicle is provided. The system includes a battery coolant line connected to a battery module. A cooling device selectively connected to the battery coolant line includes a radiator and a first water pump, to circulate a coolant therein. A first chiller is disposed in the battery coolant line and connected to a refrigerant line of an air conditioner to adjust a temperature of a coolant. A second chiller is selectively connected to the coolant line and selectively connected to the refrigerant line to increase a temperature of a coolant by selectively exchanging heat between the coolant and a refrigerant flowing into the second chiller. An integrated control valve is connected to the refrigerant line, the first connecting line, and the second connecting line to adjust a refrigerant flow direction and to selectively expand a refrigerant passing through the integrated control valve.

18 Claims, 7 Drawing Sheets

(52) U.S. Cl.
CPC .......... *B60H 1/00485* (2013.01); *B60L 58/26* (2019.02); *H01M 10/625* (2015.04); *B60H 2001/00307* (2013.01); *B60H 2001/00607* (2013.01); *B60L 2270/46* (2013.01); *B60Y 2200/90* (2013.01); *B60Y 2306/05* (2013.01); *B60Y 2400/112* (2013.01); *B60Y 2400/88* (2013.01)

(58) Field of Classification Search
CPC ................ B60H 1/00392; B60H 1/004; B60H 2001/00307; B60H 2001/00928; B60H 1/00307; B60H 1/00928; F25B 25/005; B60L 11/187; B60L 11/1874; B60L 11/1875; B60L 2240/545
See application file for complete search history.

(56) References Cited

U.S. PATENT DOCUMENTS

| | | | |
|---|---|---|---|
| 9,701,215 B1 * | 7/2017 | Kim ................... | B60H 1/00278 |
| 2012/0297809 A1 * | 11/2012 | Carpenter ............... | B60L 50/66 |
| | | | 62/244 |
| 2016/0129756 A1 * | 5/2016 | Enomoto ................ | F25B 49/02 |
| | | | 165/202 |
| 2016/0339767 A1 * | 11/2016 | Enomoto ........... | B60H 1/00278 |
| 2017/0197490 A1 * | 7/2017 | Enomoto ........... | B60H 1/00899 |
| 2017/0253105 A1 * | 9/2017 | Allgaeuer .......... | B60H 1/00385 |

\* cited by examiner

HEAT PUMP SYSTEM FOR VEHICLE WITH BATTERY AND ELECTRONIC COMPONENT COOLING

CROSS-REFERENCE TO RELATED APPLICATION

This application claims priority to and the benefit of Korean Patent Application No. 10-2018-0069001 filed on Jun. 15, 2018, the entire contents of which are incorporated herein by reference.

BACKGROUND

(a) Field of the Invention

The present invention relates to a heat pump system for a vehicle, and more particularly, to a heat pump system for a vehicle that cools a battery module using a chiller in which a refrigerant and a coolant are heat-exchanged, and improves heating efficiency by using another chiller that recovers waste heat of electrical equipment and the battery module.

(b) Description of the Related Art

Generally, an air conditioner for a vehicle includes an air conditioner system that circulates a refrigerant to heat or cool an interior of the vehicle. The air conditioner system, which can maintain a desired indoor condition by maintaining an indoor temperature of a vehicle at an appropriate temperature regardless of an outdoor temperature change, is configured to heat or cool an interior of the vehicle by heat-exchange by an evaporator during a process in which a refrigerant discharged by driving a compressor is circulated to the compressor again by passing through a condenser, a receiver drier, an expansion valve, and the evaporator. In other words, in the air conditioner system, a high-temperature and high-pressure gaseous refrigerant compressed by the compressor is condensed through the condenser, then is evaporated by the evaporator through the receiver drier and the expansion valve to decrease the indoor temperature and humidity in a summer cooling mode.

Recently, as a concern about energy efficiency and environmental pollution has gradually increased, development of an environmentally-friendly vehicle capable of being substantially substituted for a vehicle having an internal combustion engine has been required, and the environmentally-friendly vehicles are typically classified into an electric vehicle which is typically driven using a fuel cell or electricity as a power source, and a hybrid vehicle which is driven using an engine and an electric battery. In the electric vehicle and the hybrid vehicle, a separate heater is not used, unlike an air conditioner of a general vehicle, and an air conditioner, which is applied to the environmentally-friendly vehicle, is typically referred to as a heat pump system.

In the electric vehicle using the fuel cell, chemical reaction energy of oxygen and hydrogen is converted into electrical energy to generate driving force, and during this process, heat energy is generated by chemical reaction in the fuel cell, and as a result, effective removal of the generated heat is required to secure the performance of the fuel cell. Even in the hybrid vehicle, the driving force is generated by driving the motor by using electricity supplied from the fuel cell or the electric battery together with the engine that is actuated with a general fuel, and as a result, the performance of the motor may be secured only by effectively removing the heat generated from the fuel cell or the battery, and the motor.

Accordingly, in a hybrid vehicle or electric vehicle of a prior art, a battery cooling system, a cooling part, and a heat pump system should be configured to have respective separate circuits to prevent heat generation of a motor, electrical equipment, and a battery including a fuel cell. Thus, a size and a weight of a cooling module disposed in the front of the vehicle are increased, and a layout of connecting pipes for supplying a refrigerant or coolant to the heat pump system, the cooling part, and the battery cooling system inside an engine compartment becomes complex.

In addition, since the battery cooling system for warming or cooling the battery is provided separately according to a state of the vehicle so that the battery may operate in an optimal state, a plurality of valves for connecting the respective connecting pipes are applied, thus noise and vibration are transmitted to the interior of the vehicle, resulting in poor ride comfort.

The above information disclosed in this section is merely for enhancement of understanding of the background of the invention and therefore it may contain information that does not form the prior art that is already known in this country to a person of ordinary skill in the art.

SUMMARY

The present invention provides a heat pump system for a vehicle that may cool a battery module using a chiller in which a coolant and a refrigerant are heat-exchanged, and may simplify a system therefor by applying an integrated control valve that adjusts a flow of a refrigerant to reduce the number of valves. In addition, the present invention provides a heat pump system for a vehicle that may improve heating efficiency by using another chiller that recovers waste heat of electrical equipment and the battery module.

An exemplary embodiment of the present invention provides a heat pump system for a vehicle that may include: a battery coolant line configured to be connected to a battery module and into which a coolant flows; a cooling device configured to include a radiator and a first water pump connected to a coolant line, to circulate a coolant in the coolant line to cool electrical equipment, and to be selectively connected to the battery coolant line via a first valve; a first chiller disposed in the battery coolant line, to be connected to a refrigerant line of an air conditioner via a first connecting line, and configured to adjust a temperature of a coolant by selectively exchanging heat between the coolant and a refrigerant flowing into the first chiller; a second chiller selectively connected to the coolant line via a second valve, selectively connected to the refrigerant line via a second connecting line, and configured to increase a temperature of a coolant by selectively exchanging heat between the coolant and a refrigerant flowing into the second chiller; and an integrated control valve connected to the refrigerant line, the first connecting line, and the second connecting line to adjust a flow direction of a refrigerant circulated in the air conditioner and to selectively expand a refrigerant passing through the inside of the integrated control valve.

The air conditioner may include: a heating, ventilation, and air conditioning (HVAC) module connected to the air conditioner via the refrigerant line and inside of which an opening/closing door is provided to allow outside air passing through an evaporator selectively to flow into an internal condenser according to cooling, heating, and heating/dehumidifying modes of the vehicle; a compressor connected between the evaporator and the internal condenser via the refrigerant line; an accumulator disposed in the refrigerant line between the compressor and the evaporator; a first condenser connected to the internal condenser via the refrigerant line and disposed inside of the radiator; a second condenser connected to the first condenser via the refrigerant line and disposed in the front of the vehicle; and an expansion valve disposed in the refrigerant line connecting the second condenser and the evaporator.

The refrigerant line that connects the internal condenser and the first condenser and the refrigerant line that connects the second condenser and the evaporator may be respectively connected to the integrated control valve. The second connecting line may be connected to the accumulator to supply a refrigerant passing through the second chiller to the accumulator.

A sub-heat exchanger may be disposed between the evaporator and the accumulator, and the refrigerant line that connects the integrated control valve and the expansion valve and the refrigerant line that connects the evaporator and the accumulator may be respectively connected to the sub-heat exchanger. The sub-heat exchanger may be a dual pipe heat exchanger. The sub-heat exchanger may further condense a refrigerant condensed in the second condenser through heat-exchange with a low-temperature refrigerant discharged from the evaporator to flow into the expansion valve. When the battery module is cooled using the refrigerant, the integrated control valve may expand a refrigerant supplied from the second condenser through the refrigerant line and then may discharge the refrigerant to the first connecting line to allow it to flow into the first chiller.

The first valve may be disposed between the radiator and the first chiller to selectively connect the coolant line connected to the electrical equipment and the battery coolant line connected to the battery module; and a first branch line may be provided in the battery coolant line, wherein the first branch line may be connected to the battery coolant line through the first valve and may selectively connect the first chiller and the battery module based on an operation of the first valve; a third valve selectively connecting the battery coolant line may be provided in the coolant line into which a coolant discharged from the radiator flows; a second branch line connecting the radiator and the electrical equipment through the third valve may be provided in the coolant line connecting between the electrical equipment and the first valve; the second valve may be disposed in the refrigerant line between the electrical equipment and the radiator; and a third branch line selectively connected to the coolant line through the second valve may circulate a coolant passing through the electrical equipment to the coolant line connected thereto through the second valve without passing through the radiator.

When the battery module is cooled, the first valve and the third valve may block connection of the refrigerant line and the battery coolant line, and may open the first and second branch lines. In the heating mode or the heating/dehumidifying mode of the vehicle, the third branch line may be opened through an operation of the second valve. A reservoir tank may be disposed in the refrigerant line between the radiator and the third valve, and the reservoir tank may be connected to the third branch line, and may be connected to the first branch line via a degassing line.

The degassing line may be configured to discharge bubbles generated in a coolant passing through the first branch line into the reservoir tank to maintain a pressure balance between the coolant line and the battery coolant line, or may allow bubbles generated and collected in the coolant circulating in the coolant line to flow into the first branch line. The second chiller may be disposed in the third branch line, and may be selectively connected to the coolant line based on an operation of the second valve to recover waste heat generated from the electrical equipment or from the electrical equipment and the battery module in the heating mode of the vehicle.

The first condenser may be a water-cooled heat exchanger, and the second condenser may be an air-cooled heat exchanger. The second connecting line may be selectively connected to the first connecting line connected to the integrated control valve through a refrigerant valve. When the battery module is cooled using the refrigerant regardless of the modes of the vehicle, the refrigerant valve may close the second connecting line, and when the battery module is not required to be cooled in the heating mode or the heating/dehumidifying mode of the vehicle, the refrigerant valve may close the first connecting line connected to the first chiller and may open the second connecting line connected to the second chiller. A second water pump may be disposed in the battery coolant line between the first chiller and the battery module, a heater may be disposed in the battery coolant line between the battery module and the first chiller, and the heater may be turned on while a temperature of the battery module is increased to heat the coolant circulated in the battery coolant line to flow into the battery module.

According to a heat pump system for a vehicle of an exemplary embodiment of the present invention, it may be possible to simplify a system for the heat pump system for the vehicle by using a chiller in which a coolant and a refrigerant are heat-exchanged to cool a battery module in an electric vehicle or a hybrid vehicle. In addition, according to an exemplary embodiment of the present invention, since a battery module may be efficiently heated and cooled according to a mode of a vehicle, it may be possible to operate the battery module at optimal performance, and a total mileage of the vehicle may be increased through efficient management of the battery module.

Further, according to an exemplary embodiment of the present invention, it may be possible to reduce the number of valves for adjusting a flow of a refrigerant by applying an integrated control valve for controlling the flow of the refrigerant. A heat pump system according to an exemplary embodiment of the present invention may improve heating efficiency by using another electric chiller that selectively collects waste heat of electrical equipment and of a battery module. Moreover, according to a heat pump system for a vehicle of an exemplary embodiment of the present invention, by simplifying an entire system related thereto, it may be possible to reduce manufacturing costs and weight, and to improve space utilization.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DESCRIPTION OF SYMBOLS

Figure 1:
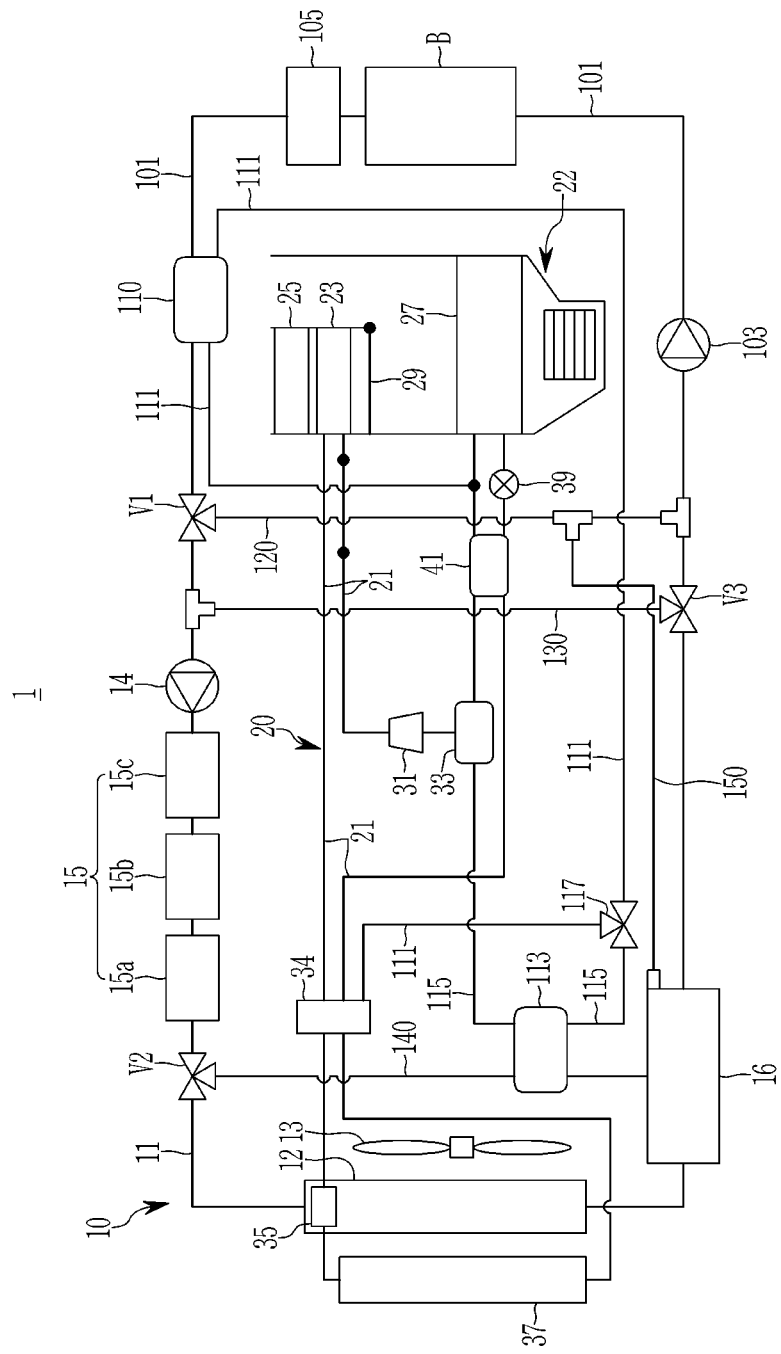
FIG. 1 illustrates a block diagram of a heat pump system for a vehicle according to an exemplary embodiment of the present invention.

1: heat pump system
10: cooling device
11: coolant line
12: radiator
13: cooling fan
14: first water pump
15: electrical equipment
16: reservoir tank
20: air conditioner
21: refrigerant line
22: HVAC module
23: internal condenser
25: internal heater
27: evaporator
29: opening/closing door
31: compressor
33: accumulator
34: integrated control valve
35: first condenser
37: second condenser
39: expansion valve
101: battery coolant line
103: second water pump
110: first chiller
111: first connecting line
113: second chiller
115: second connecting line
117: refrigerant valve
120, 130, 140: first, second, third branch line
150: degassing line
B: battery module
V1, V2, V3: first, second, third valve

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings. Since the exemplary embodiment described in the specification and the configurations shown in the drawings are merely the most preferable exemplary embodiment and configurations of the present invention, they do not represent all of the technical ideas of the present invention, and it should be understood that that various equivalents and modified examples, which may replace the exemplary embodiments, are possible when filing the present application.

In order to clearly describe the present invention, parts that are irrelevant to the description are omitted, and identical or similar constituent elements throughout the specification are denoted by the same reference numerals. Since the size and thickness of each configuration shown in the drawings are arbitrarily shown for convenience of description, the present invention is not necessarily limited to configurations illustrated in the drawings, and in order to clearly illustrate several parts and areas, enlarged thicknesses are shown. Furthermore, terms such as " . . . unit", " . . . means", " . . . part", and " . . . member" described in the specification mean a unit of a comprehensive configuration having at least one function or operation.

FIG. 1 illustrates a block diagram of a heat pump system for a vehicle according to an exemplary embodiment of the present invention. A heat pump system 1 for a vehicle according to an exemplary embodiment of the present invention may improve heating efficiency by cooling a battery module B mounted on the vehicle or selectively using waste heat generated from the battery module B or from electrical equipment 15. As shown in FIG. 1, in a hybrid vehicle or an electric vehicle, the heat pump system 1 interlocks with a cooling device 10 configured to cool the electrical equipment 15 and an air conditioner 20 configured to cool or heat a vehicle interior.

Particularly, the cooling device 10 may include a radiator 12 and a first water pump 14 connected to a coolant line 11, and may be configured to circulate a coolant to cool the electrical equipment 15. The electrical equipment 15 may include a motor 15a, an on-board charger (OBC) 15b, an electric power control unit (EPCU) 15c, and the like. The motor 15a and the electric power control unit 15c may be heated while driving, and the charger 15b may be heated while the battery module B is charged.

In the present exemplary embodiment, the radiator 12 may be disposed in the front of the vehicle, and a cooling fan 13 may be disposed behind the radiator 12, to cool the coolant through an operation of the cooling fan 13 and through heat-exchange with the outside air. The electrical equipment 15 may be disposed on the coolant line 11 between the radiator 12 and the first water pump 14. The cooling device 10 configured as described above may be configured to circulate a coolant cooled in the radiator 12 along the coolant line 11 through an operation of the first water pump 14, thereby cooling the electrical equipment 15 to prevent overheating. Additionally, the air conditioner 20 may include a heating, ventilation, and air conditioning (HVAC) module 22, a compressor 31, an accumulator 33, a first condenser 35, a second condenser 37, and an expansion valve 39 that are connected thereto via a refrigerant line 21.

An opening/closing door 29 may be disposed inside the HVAC module 22, and the opening/closing door 29 may be connected to the HVAC module 22 via the refrigerant line 21 and may be configured to adjust the outside air passing through an evaporator 27 to selectively flow into an internal condenser 23 and an internal heater 25 based on cooling, heating, and heating/dehumidifying modes of the vehicle. In other words, the opening/closing door 29 may be opened to allow the outside air passing through the evaporator 27 to flow into the internal condenser 23 and the internal heater 25 in the heating mode of the vehicle. In contrast, in the cooling mode of the vehicle, the opening/closing door 29 may close off the internal condenser 23 and the internal heater 25 to cause the outside air that is cooled while passing through the evaporator 27 to flow directly into the vehicle.

The compressor 31 may be connected between the evaporator 27 and the internal condenser 23 via the refrigerant line 21. The compressor 31 may be configured to compress a gaseous refrigerant. A temperature sensor, a pressure sensor, and the like may be disposed in the refrigerant line 21 between the compressor 31 and the internal condenser 23. The accumulator 33 may be disposed in the refrigerant line 21 between the compressor 31 and the evaporator 27. The accumulator 33 may improve efficiency and durability of the compressor 31 by supplying only the gaseous refrigerant to the compressor 31.

In the present exemplary embodiment, the first condenser 35 may be connected to the internal condenser 27 via the refrigerant line 21. The first condenser 35 may be disposed inside the radiator 12. Accordingly, the first condenser 35 may be configured to exchange heat between the refrigerant flowing thereinto and the refrigerant passing through the radiator 12. In other words, the first condenser 35 may be a water-cooled heat exchanger.

The second condenser 37 may be connected to the first condenser 35 via the refrigerant line 21. In particular, the second condenser 37 may be disposed in front of the radiator 12 to exchange heat between the refrigerant flowing into the second condenser 37 with the outside air. The second condenser 37 may be an air-cooled heat exchanger. The expansion valve 39 may be disposed in the refrigerant line 21 connecting the second condenser 37 and the evaporator 27. The expansion valve 39 may be configured to receive the refrigerant passing through the second condenser 37 to expand the refrigerant.

A sub-heat exchanger 41 may be disposed in the refrigerant line 21 between the evaporator 27 and the accumulator 33. The refrigerant line 21 for connecting the second condenser 37 and the expansion valve 39 and the refrigerant line 21 for connecting the evaporator 27 and the accumulator 33 may be connected to the sub-heat exchanger 41, respectively. Accordingly, the sub-heat exchanger 41 may further condense the refrigerant condensed in the second condenser 37 through heat-exchange with the low-temperature refrigerant discharged from the evaporator 27 to allow the refrigerant to flow into the expansion valve 39. The sub-heat exchanger 41 may be a dual pipe heat exchanger.

The heat pump system 1 according to the exemplary embodiment of the present invention may further include a battery coolant line 101, a first chiller 110, a second chiller 113, and an integrated control valve 34. The battery coolant line 101 may be connected to the battery module B, and a coolant may be circulated in the battery coolant line 101. The battery module B may be configured to supply electric power to the electrical equipment 15. The battery module B may be formed as a water-cooled type which is cooled by a coolant. In other words, the battery module B may be selectively connected to the coolant line 11 of the cooling device 10 via the battery coolant line 101, and a coolant may be circulated inside the battery module B based on an operation of a second water pump 103.

The second water pump 103 may be disposed in the battery coolant line 101 between the first chiller 110 and the battery module B. The second water pump 103 may be configured to operate to circulate a coolant through the battery coolant line 101. The first water pump 14 and the second water pump 103 may each be an electric water pump. The first chiller 110 may be disposed in the battery coolant line 101, and may be connected to the refrigerant line 21 via a first connecting line 111. The first chiller 110 may be configured to adjust a temperature of the coolant by selectively exchanging heat between the coolant and the refrigerant that flow into the first chiller 110. The first connecting line 111 connected to the first chiller 110 may be connected to the refrigerant line 21 between the evaporator 27 and the sub-heat exchanger 41. A heater 105 may be disposed in the battery coolant line 101 between the battery module B and the first chiller 110.

When the temperature of the battery module B requires increase, the heater 105 may be turned on to heat the coolant circulated in the battery coolant line 101 and thus, the coolant of which temperature is increased may be supplied to the battery module B. In addition, the heater 105 may be selectively turned on in the heating mode of the vehicle or the heating/dehumidifying mode of the vehicle to heat the coolant circulated in the battery coolant line 101. In particular, the cooling device 10 may be selectively connected to the battery coolant line 101 via a first valve V1.

The first valve V1 may be disposed between the radiator 12 and the first chiller 110 to selectively connect the coolant line 11 connected to the electrical equipment 15 and the battery coolant line 101. A first branch line 120 may be connected to the battery coolant line 101 via the first valve V1 and may selectively connect the first chiller 110 and the battery module B based on an operation of the first valve V1. In other words, the first branch line 120 may selectively connect the respective battery coolant lines 101 between the first chiller 110 and the battery module B. Accordingly, the battery coolant line 101 may form a closed circuit independent of the cooling device 10 through the first branch line 120.

The first valve V1 may selectively connect the coolant line 11 and the battery coolant line 101 or selectively connect the battery coolant line 101 and the first branch line 120 to adjust the flow of the coolant. In other words, when the battery module B is cooled using the coolant cooled in the radiator 12, the first valve V1 may connect the coolant line 11 connected to the radiator 12 to the battery coolant line 101 and may close the first branch line 120.

In addition, when increasing the temperature of the battery module B, or when cooling the battery module B using a coolant heat-exchanged with a refrigerant, the first valve V1 may open the first branch line 120 and may block the connection between the coolant line 11 and the battery coolant line 101. Accordingly, a low-temperature coolant in which the heat exchange with the refrigerant in the first chiller 110 is completed may flow into the battery module B along the battery coolant line 101 through the first branch line 120 opened by the first valve V1, to efficiently cool the battery module B.

When the temperature of the battery module B is increased, the coolant circulating along the battery coolant line 101 may be prevented from flowing into the radiator 12 through the operation of the first valve V1, thus it may be possible to rapidly increase the temperature of the battery module B by allowing the coolant heated through the operation of the battery module B to flow into the battery module B.

In the present exemplary embodiment, the second chiller 113 may be selectively connected to the coolant line 11 via a second valve V2, and selectively connected to the refrigerant line 21 via a second connecting line 115. The second valve V2 may be disposed in the coolant line 11 between the electrical equipment 15 and the radiator 12. The second chiller 113 may be configured to recover the waste heat from the high-temperature coolant heated by the heat generated from the electrical equipment 15 or from the electrical equipment 15 and the battery module B to flow into the second chiller and exchanges heat between the coolant and the refrigerant, thereby increasing the temperature of the refrigerant.

The second connecting line 115 may be connected to the accumulator 33 to supply a refrigerant passing through the second chiller 113 to the accumulator 33. The integrated control valve 34 may be respectively connected to the refrigerant line 21, the first connecting line 111, and the second connecting line 115 to adjust a flow direction of the refrigerant circulated in the air conditioner 20 and to selectively expand the refrigerant passing through the inside of the integrated control valve 34.

The integrated control valve 34 may be connected to the refrigerant line 21 for connecting the internal condenser 23 and the first condenser 35 and to the refrigerant line 21 for connecting the second condenser 37 and the evaporator 27, respectively. The second connecting line 115 may be selectively connected to the first connecting line 111 connected to the integrated control valve 34, via a refrigerant valve 117. The refrigerant valve 117 may open the first connecting line 111 and close the second connecting line 115 when the battery module B is cooled using the refrigerant regardless of the mode of the vehicle (e.g., the cooling, heating, or heating/dehumidifying mode).

In particular, the integrated control valve 34 may allow the refrigerant of an expanded state to flow into the first connecting line 111. In other words, when the battery module B is cooled using the refrigerant, the integrated control valve 34 may expand the refrigerant supplied from the second condenser 37 through the refrigerant line 21, and then may discharge the refrigerant to the first connecting line 111 to allow the refrigerant to flow into the first chiller 110. Thus, since the refrigerant discharged from the second condenser 37 may be expanded in the integrated control valve 34 and temperature thereof may be decreased, and the refrigerant of the decreased temperature flows into the first chiller 110, it may be possible to further decrease the temperature of the coolant passing through the inside of the first chiller 110.

The coolant having the decreased temperature while passing through the first chiller 110 may flow into the battery module B. Therefore, the battery module B may be cooled more efficiently. On the other hand, when the cooling of the battery module B is not required in the heating mode or the heating/dehumidifying mode of the vehicle, the refrigerant valve 117 may close the first connecting line 111 connected to the first chiller 110. At the same time, the refrigerant valve 117 may open the second connecting line 115 connected to the second chiller 113.

In the present exemplary embodiment, a third valve V3 for selectively connecting the battery coolant line 101 connected to the battery module B may be disposed in the coolant line 11 in which the coolant discharged from the radiator 12 flows. A second branch line 130 for connecting the radiator 12 and the electrical equipment 15 through the third valve V3 may be disposed in the refrigerant line 101 which connects between the electrical equipment 15 and the first valve V1.

In addition, when the battery module B is cooled using a refrigerant, the first valve V1 and the third valve V3 may block the connection of the coolant line 11 and the battery coolant line 101 and may open the first and second branch lines 120 and 130, respectively. In addition, when the electrical equipment 15 is cooled using a coolant, the third valve V3 may block the connection of the coolant line 11 and the battery coolant line 101 and may open the second branch line 130. In other words, the coolant cooled in the radiator 12 may flow into the electrical equipment 15 through the second branch line 130, thus it may be possible to rapidly cool the electrical equipment 15. When the battery module B is cooled using the coolant heat-exchanged with the refrigerant, or when the battery module B is warmed up and heated, the third valve V3 may open the second branch line 130 and may block the connection of the coolant line 11 and the battery coolant line 101.

A third branch line 140 may be disposed in the cooling device 10. The third branch line 140 may be selectively connected to the coolant line 11 via the second valve V2 and may be configured to circulate the coolant passing through the electrical equipment 15 to the coolant line 11 connected thereto via the second valve V2 without passing through the radiator 12. In addition, the third branch line 140 may be opened through the operation of the second valve V2 in the heating mode or the heating/dehumidifying mode of the vehicle. At the same time, the second valve V2 may close the coolant line 11 connected to the radiator 12. Accordingly, the coolant heated while cooling the electrical equipment 15 may flow into the second chiller 113 along the third branch line 140.

The second chiller 113 may be disposed in the third branch line 140. The second chiller 113 may be selectively connected to the coolant line 11 based on the operation of the second valve V2 to recover the waste heat generated from the electrical equipment 15 or from the electrical equipment 15 and the battery module B in the heating mode of the vehicle. In other words, when the waste heat of the battery module B and the electrical equipment 15 is recovered in the heating mode of the vehicle, the third branch line 140 may be opened through the operation of the second valve V2 in a state in which the coolant line 11 connected to the radiator 12 is closed.

A reservoir tank 16 may be disposed in the coolant line 11 between the radiator 12 and the third valve V3. The reservoir tank 16 may store the cooled coolant flowing from the radiator 12. The reservoir tank 16 may be connected to the third branch line 140 via the second valve V2 disposed in the coolant line 11 between the radiator 12 and the electrical equipment 15. In addition, the reservoir tank 16 may be connected to the first branch line 120 via a degassing line 150.

The degassing line 150 may be configured to discharge bubbles generated in the coolant passing through the first branch line 120 into the reservoir tank 16 to maintain a pressure balance between the coolant line 11 and the battery coolant line 101, or may allow bubbles generated and collected in the coolant circulating in the coolant line 11 to flow into the first branch line 120. In addition, when the coolant does not circulate in the coolant line 11 and when the battery module B is cooled using the coolant heat-exchanged with the refrigerant, the degassing line 150 may allow some of the bubbles contained in the coolant passing through the first branch line 120 to flow into the reservoir tank 16, thereby preventing a pressure difference between the coolant line 11 and the first branch line 120 from occurring.

In the present exemplary embodiment, it is exemplarily described that the reservoir tank 16 is disposed in the coolant line 11 between the radiator 12 and the battery module B and the degassing line 150 is connected to the first branch line 120, but the present invention is not limited thereto, and the reservoir tank 16 may be disposed in the battery coolant water line 101 between the radiator 12 and the battery module B. In this case, the degassing line 150 may be connected to the second branch line 130. In addition, the first, second, and third valves V1, V2, and V3 and the refrigerant valve 117 that are configured as described above may each be a 3-way valve capable of distributing a flow, respectively.

Figure 2:
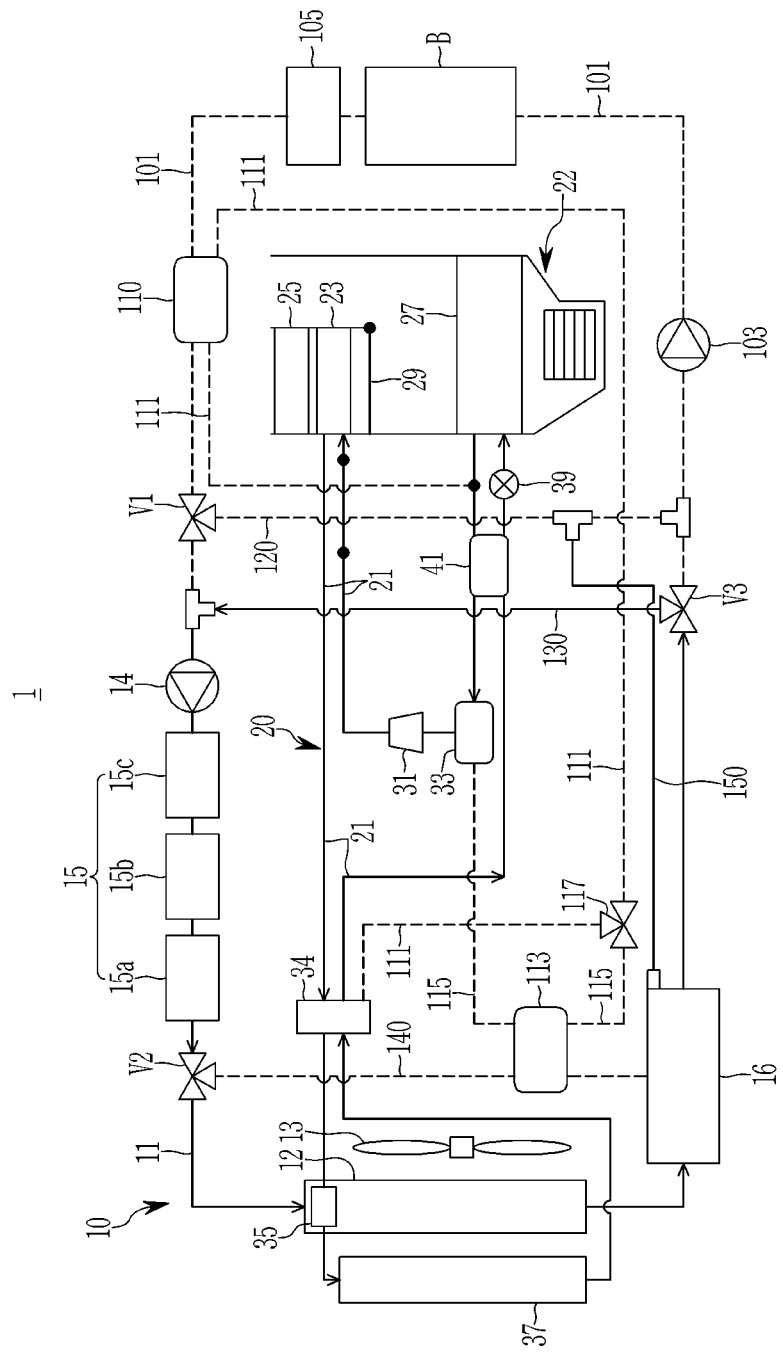
FIG. 2 illustrates an operational state diagram of a cooling mode of a vehicle in a heat pump system for the vehicle according to an exemplary embodiment of the present invention.

Hereinafter, an operation and function for each mode of the heat pump system 1 for the vehicle according to the exemplary embodiment of the present invention configured as described above will be described in detail with reference to FIG. 2 to FIG. 7. First, in the heat pump system 1 for the vehicle according to the exemplary embodiment of the present invention, an operation for the cooling mode of the vehicle will be described with reference to FIG. 2. FIG. 2 illustrates an operational state diagram of a cooling mode of a vehicle in a heat pump system for the vehicle according to an exemplary embodiment of the present invention.

Referring to FIG. 2, the cooling device 10 may be operated for cooling the electrical equipment 15. In particular, the third valve V3 may connect the coolant line 11 connected to the radiator 12 and the second branch line 130 and block the battery coolant line 101 from being connected. The first valve V1 may block the connection between the battery coolant line 101 and the coolant line 11, and at the same time, close the first branch line 120. The second valve V2 may open the coolant line 11 for connecting the radiator 12 and the electrical equipment 15, and close the third branch line 140.

Further, the coolant line 11 may be connected to the second branch line 130 through the operation of the first, second, and third valves V1, V2, and V3, and may form a closed circuit that is separated from the battery coolant line 101. Accordingly, the coolant cooled in the radiator 12 may be circulated in the coolant line 11 and the second branch line 130 through the operation of the first water pump 14 to cool the electrical equipment 15. The circulation of the coolant in the battery coolant line 101 may be stopped. In other words, the cooled coolant discharged from the radiator 12 may pass through the electrical equipment 15 through the coolant line 11 and the second branch line 130, and flow into the radiator 12 again.

In particular, the degassing line 150 may allow the bubbles generated and collected in the coolant circulating in the coolant line 11 to flow into the first branch line 120 to maintain the pressure balance in the coolant line 11. The air conditioner 20 may be configured to circulate the refrigerant along the refrigerant line 21 to cool the interior of the vehicle. The integrated control valve 34 may block the first connecting line 111 to adjust the flow of the refrigerant. Accordingly, the refrigerant may be discharged from the second condenser 37 through the operation of the integrated control valve 34 and may flow in the refrigerant line 21 to cool the interior of the vehicle, and then sequentially may pass through the expansion valve 39, the evaporator 27, the accumulator 33, the compressor 31, the internal condenser 23, and the first condenser 35.

The outside air flowing into the HVAC module 22 may be cooled while passing through the evaporator 27 by the low-temperature refrigerant flowing into the evaporator 27. In particular, a part of the opening/closing door 29 passing through the internal condenser 23 may be closed to prevent the cooled outside air from passing through the internal condenser 23 and the internal heater 25. Accordingly, the cooled outside air may flow directly into the interior of the vehicle, thereby cooling the vehicle interior. The refrigerant may then pass through the first condenser 35 to flow into the second condenser 37, and may be condensed through the heat-exchange with the outside air while passing through the second condenser 35. In other words, the refrigerant may cool the interior of the vehicle in the cooling mode of the vehicle while repeating the above-described processes.

Figure 3:
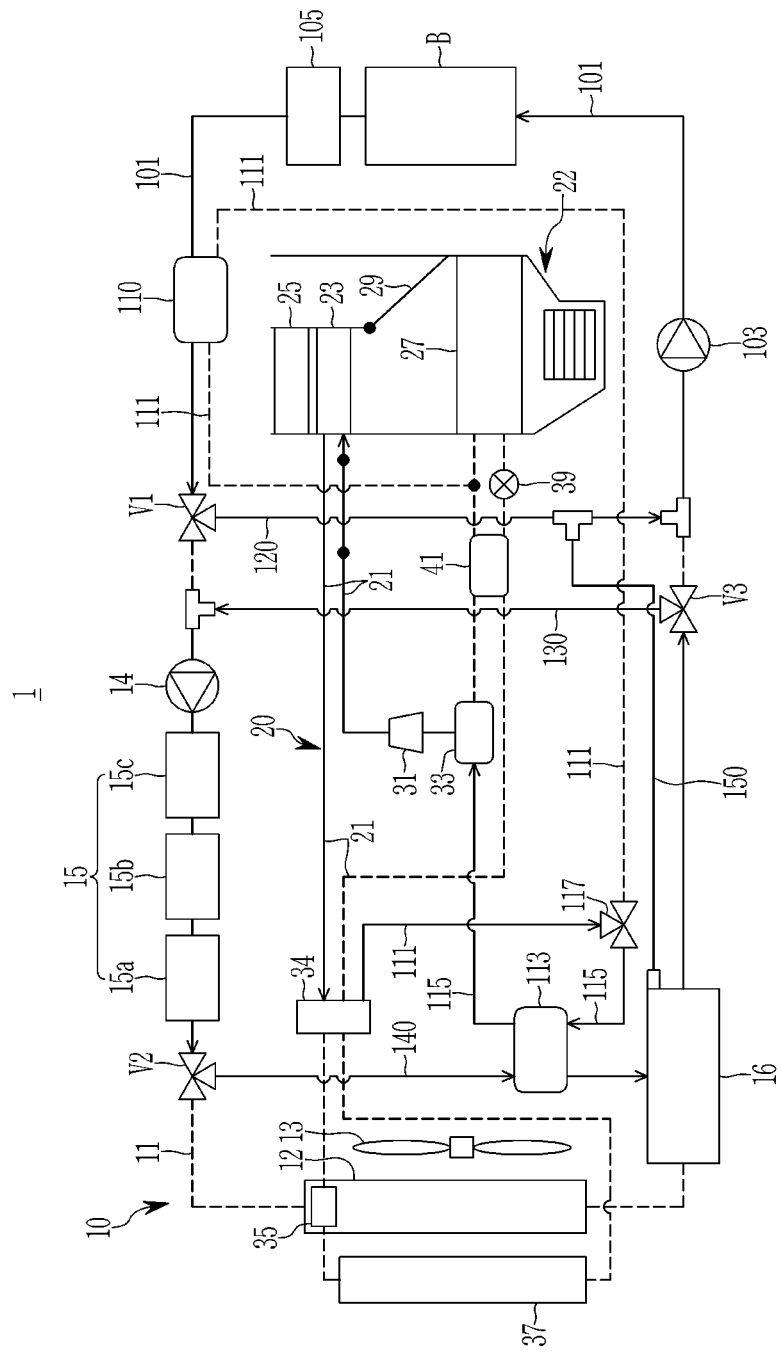
FIG. 3 illustrates an operational state diagram of a heating mode of a vehicle in a heat pump system for the vehicle according to an exemplary embodiment of the present invention.

Hereinafter, an operation according to the heating mode of the vehicle will be described with reference to FIG. 3. FIG. 3 illustrates an operational state diagram of a heating mode of a vehicle in a heat pump system for the vehicle according to an exemplary embodiment of the present invention. Referring to FIG. 3, in the heating mode of the vehicle, the connection of the coolant line 11 and the battery coolant line 101 may be blocked through the operation of the first and third valves V1 and V3, and the first and second branch lines 120 and 130 may be opened.

The second valve V2 may close the connection of the coolant line 11 and simultaneously open the third branch line 140 to disconnect the electrical equipment 15 from the radiator 12. Accordingly, the cooling device 10 may form a closed circuit that is separated from the battery coolant line 101 through the second and third branch lines 130 and 140 opened by the operation of the first and third valves V1 and V3 and the coolant line 11. In addition, the battery coolant line 101 may be configured to circulate the coolant in the battery module B and the first chiller 110 together with the first branch line 120, and form a closed circuit that is separated from the coolant line 11.

Accordingly, the temperature of the coolant circulating in the cooling device 10 increases due to the waste heat generated in the electrical equipment 15. The coolant with the increased temperature may be circulated through the operation of the first water pump 14 and may pass through the second chiller 113 along the opened third branch line 140. In the air conditioner 20, the refrigerant may pass through the compressor 31 and the internal condenser 23 along the refrigerant line 21, and then may flow into the first connecting line 111 through the operation of the integrated control valve 34.

In particular, the integrated control valve 34 may close the refrigerant line 21 connected to the first and second condensers 35 and 37. The refrigerant valve 117 may connect the first connecting line 111 connected to the integrated control valve 34 to the second connecting line 115. Accordingly, the refrigerant may flow into the second chiller 113 through the second connecting line 115. The integrated control valve 34 may discharge the refrigerant to the first connecting line 111 without expanding the refrigerant. Therefore, the refrigerant discharged from the internal condenser 23 may flow to the first connecting line 111 through the operation of the integrated control valve 34. Thereafter, the refrigerant may flow into the second connecting line 115 opened through the operation of the refrigerant valve 117.

The refrigerant may then flow into the second chiller 113 through the second connecting line 115 and may be heat-exchanged with the heated coolant flowing into the second chiller 113. In other words, the waste heat generated in the electrical equipment 15 may increase the temperature of the refrigerant in the second chiller 113. The refrigerant with the increased temperature may pass through the accumulator 33 through the second connecting line 115 and then may flow into the compressor 31. In addition, the refrigerant may be compressed to a high-temperature and high-pressure state by the compressor 31 and may flow into the internal condenser 23. The opening/closing door 29 may be opened to cause the outside air flowing into the HVAC module 22 and passing through the evaporator 27 to pass through the internal condenser 23.

Accordingly, the outside air introduced from the outside may flow in the room temperature state in which it is not cooled when passing through the evaporator 27 to which no refrigerant is supplied. The introduced outside air may be converted into a high-temperature state while passing through the internal condenser 23 and may flow into the interior of the vehicle through the selectively operating internal heater 25, thereby heating the interior of the vehicle. In other words, in the heating mode of the vehicle, the heat pump system 1 according to the present exemplary embodiment may reduce the power consumption of the compressor 31 and improve the heating efficiency by using waste heat generated in the electrical equipment 15 to increase the temperature of the refrigerant.

When collecting the waste heat generated in the electrical equipment 15 and the battery module B together, the coolant line 11 and the battery coolant line 101 may be connected through the operation of the first and third valves V1 and V3, and the first and second branch lines 120 and 130 may be closed. Accordingly, the second chiller 113 may be connected to the coolant line 11 and the battery coolant line 101 through the third branch line 140.

Then, the coolant of increased temperature due to the waste heat generated in the electrical equipment 15, and the waste heat generated in the battery module B may pass through the second chiller 113 through the operation of the first and second water pumps 14 and 103. In other words, the waste heat generated in the electrical equipment 15 and the battery module B increases the temperature of the refrigerant in the second chiller 113. The refrigerant with the increased temperature may pass through the accumulator 33 through the second connecting line 115 and then my flow into the compressor 31. The refrigerant may be compressed in a high-temperature and high-pressure state by the compressor 31 and may flow into the internal condenser 23.

Particularly, the opening/closing door 29 may be opened to cause the outside air flowing into the HVAC module 22 and passing through the evaporator 27 to pass through the internal condenser 23. Accordingly, the outside air introduced from the outside may flow in the room temperature state in which it is not cooled when passing through the evaporator 27 to which no refrigerant is supplied. The introduced outside air may be converted into a high-temperature state while passing through the internal condenser 23 and may flow into the interior of the vehicle through the selectively operating internal heater 25, thereby heating the interior of the vehicle. In other words, the heat pump system 1 according to the present exemplary embodiment may be used to heat the interior of the vehicle by selectively using the waste heat of the electrical equipment 15 or the waste heat of the battery module B and the electrical equipment 15.

Figure 4:
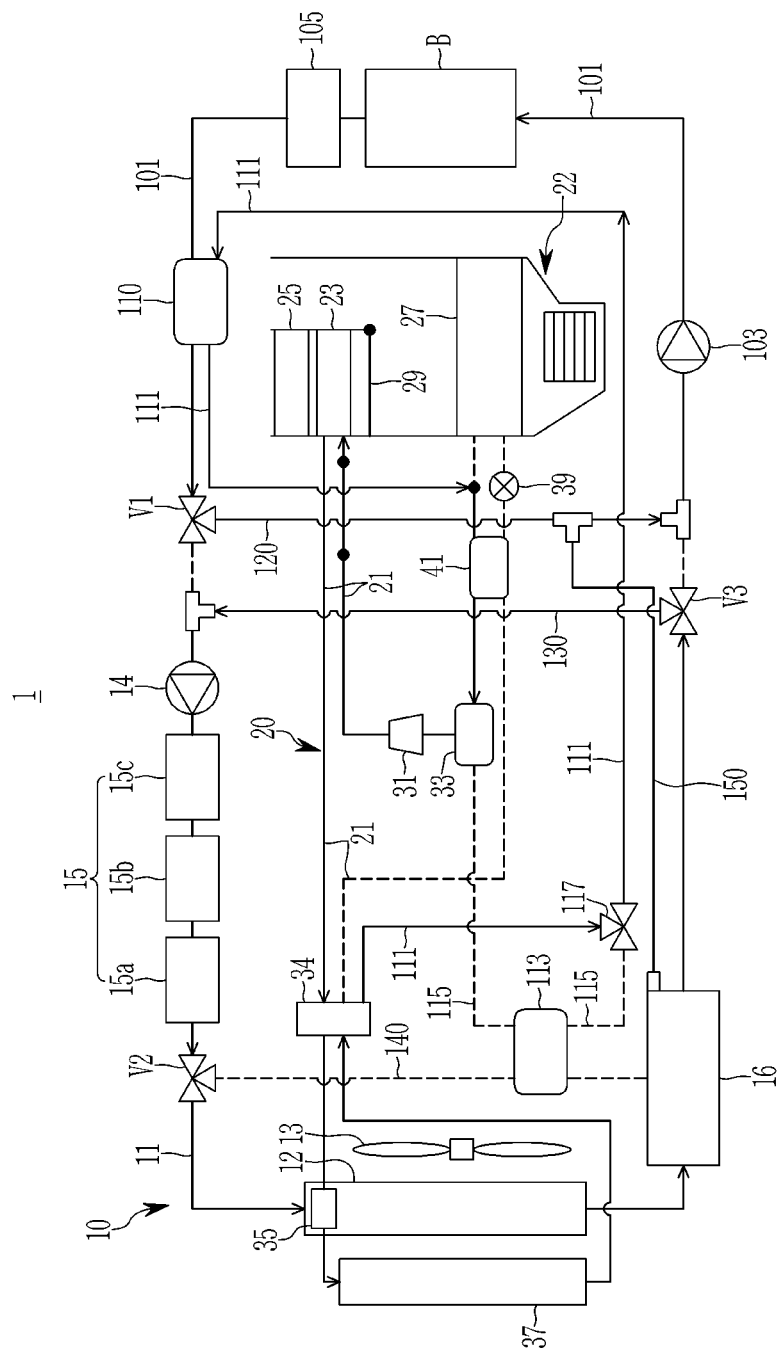
FIG. 4 illustrates an operational state diagram for cooling a battery module using a refrigerant in a heat pump system for a vehicle according to an exemplary embodiment of the present invention.

Hereinafter, an operation of cooling the battery module B using the coolant will be described with reference to FIG. 4. FIG. 4 illustrates an operational state diagram for cooling a battery module using a refrigerant in a heat pump system for a vehicle according to an exemplary embodiment of the present invention. Referring to FIG. 4, the cooling device 10 operates for cooling the electrical equipment 15.

Particularly, the first valve V1 may open the first branch line 120 and close the connection of the coolant line 11 and the battery coolant line 101. The third valve V3 may close the connection of the coolant line 11 and the battery coolant line 101 and open the second branch line 130. The second valve V2 may close the third branch line 140 and open the coolant line 11 for connecting the radiator 12 and the electrical equipment 15. Accordingly, the coolant line 11 and the battery coolant line 101 may form a closed circuit in which the coolant is independently circulated through the first and second branch lines 120 and 130, respectively.

In other words, the coolant cooled in the radiator 12 may be circulated in the coolant line 11 and the second branch line 130 to cool the electrical equipment 15 through the operation of the first water pump 14. In addition, the coolant passing through the first chiller 110 may be circulated in the battery coolant line 101 and the first branch line 120 to cool the battery module B through the operation of the second water pump 103. The coolant circulated in the battery coolant line 101 may be heat-exchanged with the refrigerant in the first chiller 110 and cooled, and may be supplied to the battery module B. Accordingly, the battery module B may be cooled by the cooled coolant.

The degassing line 150 may be configured to discharge bubbles generated in the coolant passing through the first branch line 120 into the reservoir tank 16 to maintain a pressure balance between the coolant line 11 and the battery coolant line 101, or may allow bubbles generated and collected in the coolant circulating in the coolant line 11 to flow into the first branch line 120. The air conditioner 20 may be configured to circulate the refrigerant along the refrigerant line 21. In particular, the integrated control valve 34 may open the first connecting line 111. Accordingly, the refrigerant that sequentially passes through the first and second condensers 35 and 37 may flow into the first connecting line 111.

The refrigerant flowing into the first connecting line 111 may flow to the first connecting line 111 connected to the first chiller 110 by the operation of the refrigerant valve 117. At the same time, the second connecting line 115 may be closed by the operation of the refrigerant valve 117, thus the flow of the refrigerant may be stopped. In particular, the integrated control valve 34 may allow the refrigerant of the expansion state to flow into the first connecting line 111. Accordingly, the refrigerant discharged from the second condenser 37 may be expanded through the operation of the integrated control valve 34 to enter a low-temperature and low-pressure state, and may flow into the first chiller 110 connected to the first connecting line 111.

Thereafter, the refrigerant flowing into the first chiller 110 may be heat-exchanged with the coolant and may flow into the accumulator 33 through the first connecting line 111. In other words, the coolant with increased temperature while cooling the battery module B may be cooled through the heat-exchange with the low-temperature and low-pressure refrigerant inside the first chiller 110. The cooled coolant may be supplied again to the battery module B through the battery coolant line 101. Thus, the battery B may be efficiently cooled by the coolant while the operation as described above is repeated.

Figure 5:
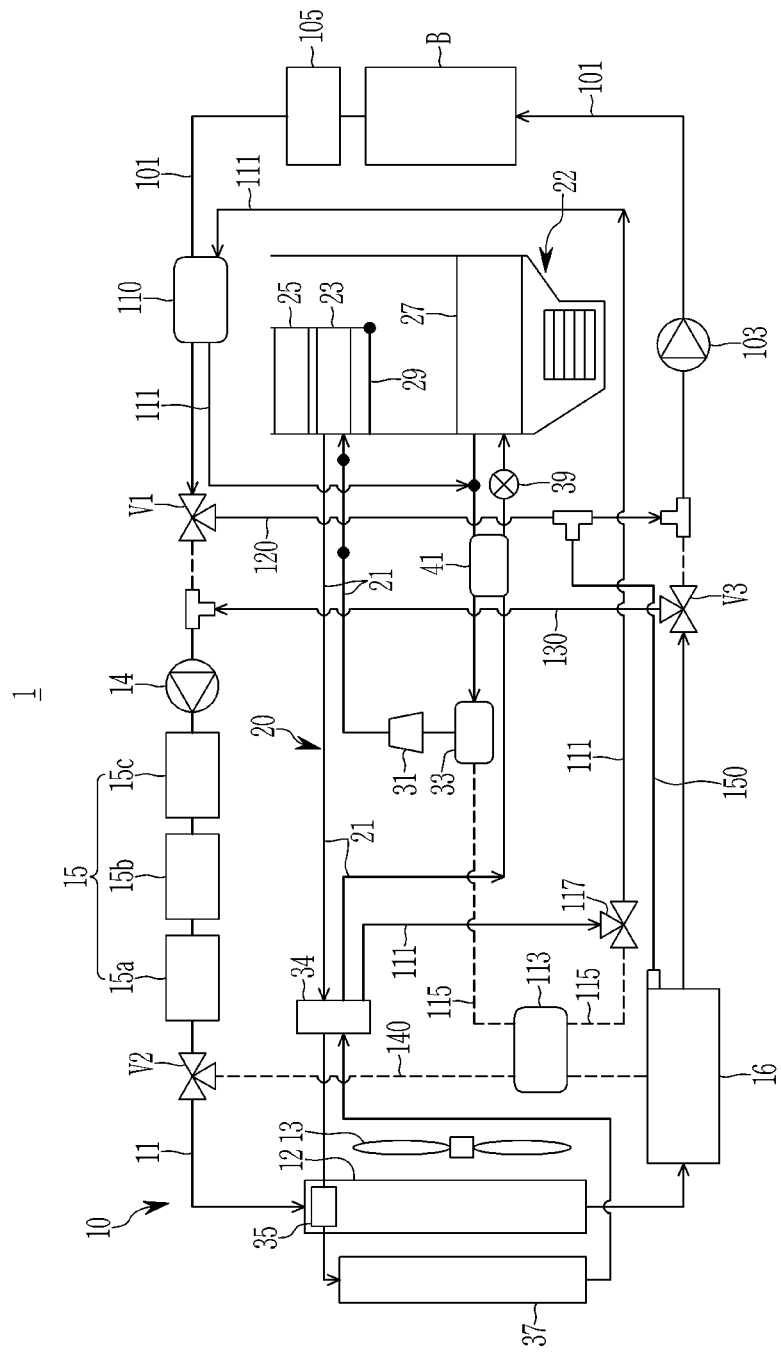
FIG. 5 illustrates an operational state diagram for cooling a battery module during a cooling mode of a vehicle in a heat pump system for the vehicle according to an exemplary embodiment of the present invention.

Hereinafter, an operation of cooling the battery module in the cooling mode of the vehicle will be described with reference to FIG. 5. FIG. 5 illustrates an operational state diagram for cooling a battery module during a cooling mode of a vehicle in a heat pump system for the vehicle according to an exemplary embodiment of the present invention. Referring to FIG. 5, the cooling device 10 may be operated for cooling the electrical equipment 15.

Particularly, the first valve V1 may open the first branch line 120 and close the connection of the coolant line 11 and the battery coolant line 101. The third valve V3 may close the connection of the coolant line 11 and the battery coolant line 101 and open the second branch line 130. The second valve V2 may close the third branch line 140 and open the coolant line 11 for connecting the radiator 12 and the electrical equipment 15. Accordingly, the coolant line 11 and the battery coolant line 101 may form a closed circuit in which the coolant is independently circulated through the first and second branch lines 120 and 130, respectively.

In other words, the coolant cooled in the radiator 12 may be circulated in the coolant line 11 and the second branch line 130 to cool the electrical equipment 15 through the operation of the first water pump 14. In addition, the coolant passing through the first chiller 110 may be circulated in the battery coolant line 101 and the first branch line 120 to cool the battery module B through the operation of the second water pump 103. The coolant circulated in the battery coolant line 101 may be heat-exchanged with the refrigerant in the first chiller 110 and cooled, and may be supplied to the battery module B. Accordingly, the battery module B may be cooled by the cooled coolant.

The degassing line 150 may be configured to discharge bubbles generated in the coolant passing through the first branch line 120 into the reservoir tank 16 to maintain a pressure balance between the coolant line 11 and the battery coolant line 101, or may allow bubbles generated and collected in the coolant circulating in the coolant line 11 to flow into the first branch line 120. Meanwhile, the air conditioner 20 may be configured to circulate the refrigerant along the refrigerant line 21 to cool the vehicle interior, thereby cooling the vehicle interior.

The integrated control valve 34 may connect the internal condenser 23 to the first and second condensers 35 and 37 and connect the second condenser 37 and the evaporator 27. At the same time, the integrated control valve 34 may open the first connecting line 111. Accordingly, some of the refrigerant sequentially passing through the first and second condensers 35 and 37 may flow into the first connecting line 111, and the remaining thereof may flow into the evaporator 27.

The refrigerant flowing into the first connecting line 111 may flow to the first connecting line 111 connected to the first chiller 110 by the operation of the refrigerant valve 117. At the same time, the second connecting line 115 may be closed by the operation of the refrigerant valve 117, thus the flow of the refrigerant may be stopped. In particular, the integrated control valve 34 may allow the refrigerant of an expanded state to flow into the first connecting line 111.

Accordingly, among the refrigerant discharged from the second condenser 37, the refrigerant flowing into the first connecting line 111 may be expanded through the operation of the integrated control valve 34 to enter a low-temperature and low-pressure state, and may flow into the first chiller 110 connected to the first connecting line 111. Thereafter, the refrigerant flowing into the first chiller 110 may be heat-exchanged with the coolant and may flow into the accumulator 33 through the first connecting line 111. In other words, the coolant having increased temperature while cooling the battery module (B) may be cooled through the heat-exchange with the low-temperature and low-pressure refrigerant inside the first chiller 110. The cooled coolant may be supplied again to the battery module B through the battery coolant line 101.

In other words, the battery B may be efficiently cooled by the coolant while the operation as described above is repeated. The remaining refrigerant discharged from the second condenser 37 may flow through the refrigerant line 21 to cool the interior of the vehicle, and may sequentially pass through the sub-heat exchanger 41, the expansion valve 39, the evaporator 27, the accumulator 33, the compressor 31, and the internal condenser 23.

The outside air flowing into the HVAC module 22 may be cooled while passing through the evaporator 27 by the low-temperature refrigerant flowing into the evaporator 27. In particular, a part of the opening/closing door 29 passing through the internal condenser 23 may be closed to prevent the cooled outside from passing through the internal condenser 23 and the internal heater 25. Accordingly, the cooled outside air may flow directly into the interior of the vehicle, thereby cooling the vehicle interior.

Thereafter, the refrigerant may be heat-exchanged with the coolant of the radiator 12 while passing through the first condenser 35, and may be condensed through heat-exchange with the outside air while passing through the second condenser 37. In other words, the refrigerant may cool the interior of the vehicle in the cooling mode of the vehicle while repeating the above-described processes, and at the same time, may cool the coolant through the heat exchange while passing through the first chiller 110.

Figure 6:
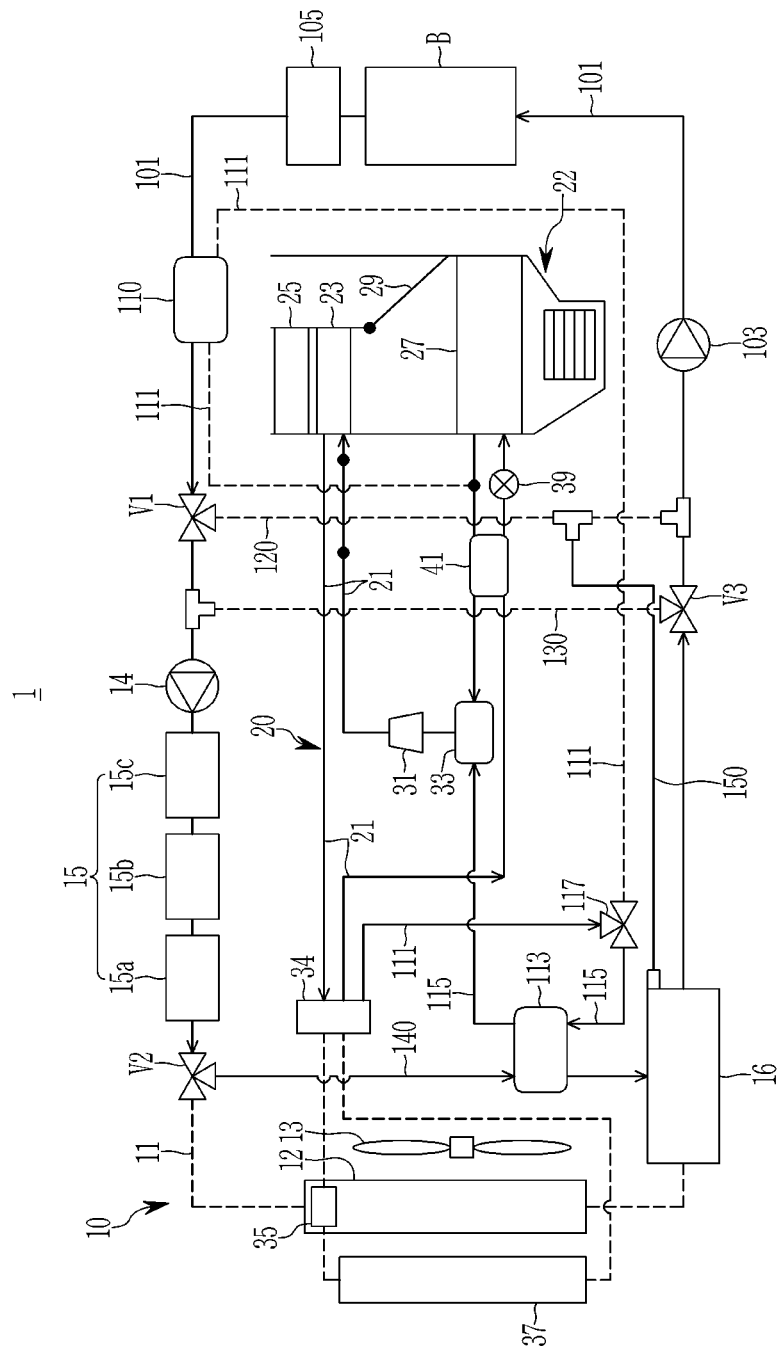
FIG. 6 illustrates an operational state diagram of a heating/dehumidifying mode in a heat pump system for a vehicle according to an exemplary embodiment of the present invention.

Hereinafter, an operation of the heating/dehumidifying mode of the vehicle will be described with reference to FIG. 6. FIG. 6 illustrates an operational state diagram of a heating/dehumidifying mode in a heat pump system for a vehicle according to an exemplary embodiment of the present invention. Referring to FIG. 6, in the heating/dehumidifying mode of the vehicle, the coolant line 11 and the battery coolant line 101 may be connected through the operation of the first and third valves V1 and V3, and the first and second branch lines 120 and 130 may be closed.

The second valve V2 may close the connection of the coolant line 11 and simultaneously open the third branch line 140 to disconnect the electrical equipment 15 from the radiator 12. Accordingly, the cooling device 10 may form one closed circuit connected to the battery coolant line 101 through the second and third branch lines 130 and 140 closed by the operation of the first and third valves V1 and V3, and the coolant line 11. Accordingly, the temperature of the coolant circulated in the coolant line 11 and the battery coolant line 101 may be increased due to the waste heat generated in the electrical equipment 15 and the waste heat generated in the battery module B. The coolant with the increased temperature may be circulated through the operation of the first and second water pumps 14 and 103 and may pass through the second chiller 113 along the opened third branch line 140.

On the other hand, in the air conditioner 20, the refrigerant may pass through the compressor 31 and the internal condenser 23 along the refrigerant line 21, and then, through the operation of the integrated control valve 34, some of the refrigerant may pass into the first connecting line 111 and the remainder of the refrigerant may flow into the evaporator 27. In particular, the integrated control valve 34 may close the refrigerant line 21 connected to the first and second condensers 35 and 37. The refrigerant valve 117 may connect the first connecting line 111 connected to the integrated control valve 34 to the second connecting line 115. Accordingly, the refrigerant may flow into the second chiller 113 through the second connecting line 115.

The integrated control valve 34 may discharge the refrigerant to the first connecting line 111 without expanding the refrigerant. Accordingly, some of the refrigerant discharged from the internal condenser 23 may flow to the first connecting line 111 through the operation of the integrated control valve 34. Thereafter, the refrigerant may flow into the second connecting line 115 opened through the operation of the refrigerant valve 117.

Further, the refrigerant may flow into the second chiller 113 through the second connecting line 115 and may be heat-exchanged with the coolant having increased temperature in the second chiller 113. In other words, the waste heat generated in the electrical equipment 15 and the battery module B may increase the temperature of the refrigerant in the second chiller 113. The refrigerant with the increased temperature may pass through the accumulator 33 through the second connecting line 115 and then may flow into the compressor 31. The refrigerant may be compressed in a high-temperature and high-pressure state by the compressor 31 and may flow into the internal condenser 23.

The remaining refrigerant discharged from the internal condenser 23 may sequentially pass through the sub-heat exchanger 41, the expansion valve 39, the evaporator 27, the accumulator 33, the compressor 31, and the internal condenser 23 along the refrigerant line 21 from the integrated control valve 34. In other words, the remaining refrigerant discharged from the integrated control valve 34 may flow into the evaporator 27 in an expanded state in the expansion valve 39. The sub-heat exchanger 41 may further condense the refrigerant passing through the integrated control valve 34 through the heat-exchange with the low-temperature refrigerant discharged from the evaporator 27 to flow into the expansion valve 39.

In this state, the opening/closing door 29 may be opened to allow the outside air flowing into the HVAC module 22 to pass through the evaporator 27 to pass through the internal condenser 23. Accordingly, the outside air flowing into the HVAC module 22 may be dehumidified by the low-temperature refrigerant flowing into the evaporator 27 while passing through the evaporator 27. Thereafter, the outside air may be converted into a high-temperature state while passing through the internal condenser 23 and may flow into the interior of the vehicle through the selectively operating internal heater 25, thereby heating/dehumidifying the interior of the vehicle. In other words, in the heating/dehumidifying mode of the vehicle, the heat pump system 1 according to the present exemplary embodiment may reduce the power consumption of the compressor 31 and improve the heating efficiency by using the waste heat generated in the electrical equipment 15 and the battery module B to increase the temperature of the refrigerant.

Figure 7:
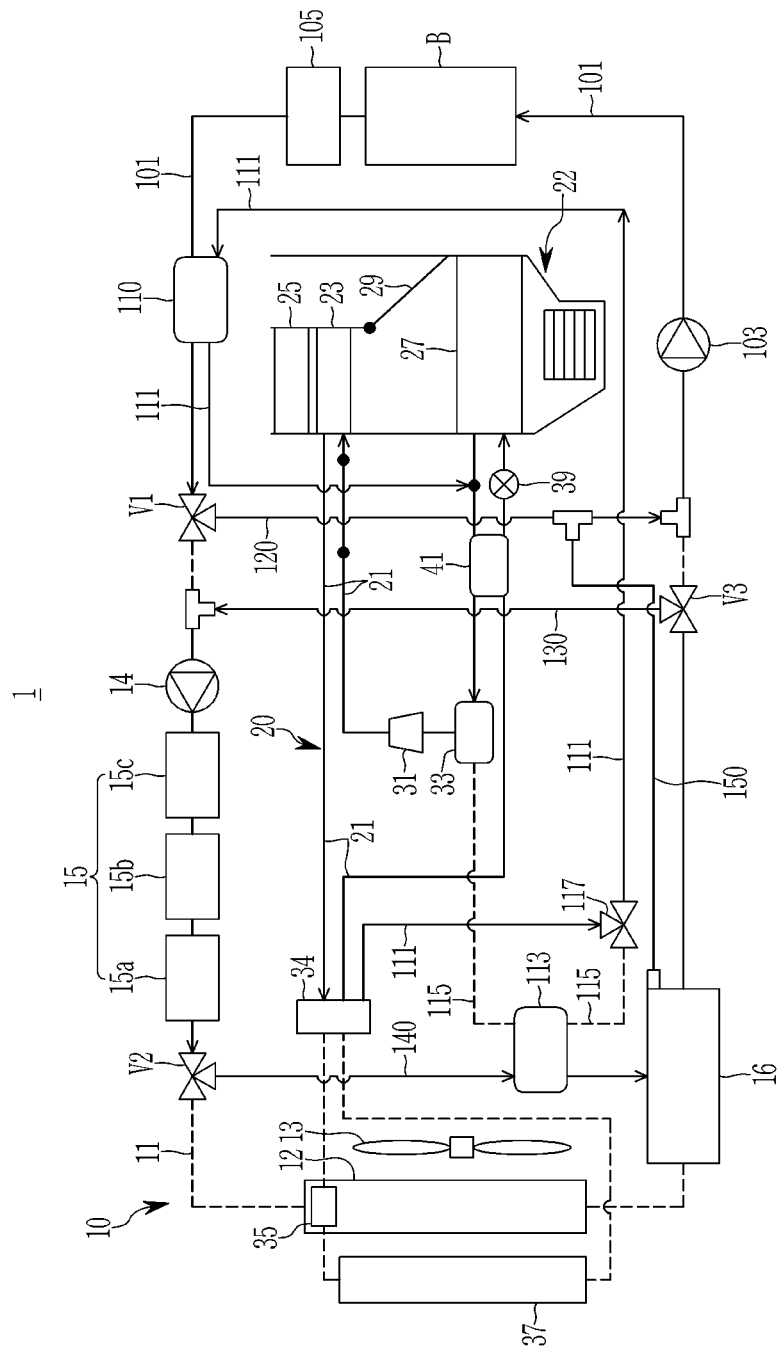
FIG. 7 illustrates an operational state diagram for cooling a battery module during a heating/dehumidifying mode in a heat pump system for a vehicle according to an exemplary embodiment of the present invention.

Hereinafter, an operation of cooling the battery module B in the heating/dehumidifying mode of the vehicle will be described with reference to FIG. 7. FIG. 7 illustrates an operational state diagram for cooling a battery module during a heating/dehumidifying mode in a heat pump system for a vehicle according to an exemplary embodiment of the present invention. Referring to FIG. 7, in the heating/dehumidifying mode of the vehicle, when the battery module B is cooled, the connection of the coolant line 11 and the battery coolant line 101 may be blocked through the operation of the first and third valves V1 and V3, and the first and second branch lines 120 and 130 may be opened.

The second valve V2 may close the connection of the coolant line 11 and simultaneously open the third branch line 140 to disconnect the electrical equipment 15 from the radiator 12. Accordingly, the cooling device 10 may form a closed circuit that is separated from the battery coolant line 101 through the second and third branch lines 130 and 140 opened by the operation of the first and third valves V1 and V3 and the coolant line 11. Accordingly, the temperature of the coolant circulating in the cooling device 10 may increase due to the waste heat generated in the electrical equipment 15. The coolant with the increased temperature may be circulated through the operation of the first water pump 14 and may pass through the second chiller 113 along the opened third branch line 140.

In the present exemplary embodiment, the battery coolant line 101 may be configured to circulate the coolant in the battery module B and the first chiller 110 together with the first branch line 120, and form a closed circuit that is separated from the coolant line 11. The coolant passing through the first chiller 110 may be circulated in the battery coolant line 101 and the first branch line 120 to cool the battery module B through the operation of the second water pump 103. The coolant circulated in the battery coolant line 101 may be heat-exchanged with the refrigerant in the first chiller 110 and cooled, and may be supplied to the battery module B. Accordingly, the battery module B may be cooled by the cooled coolant.

The degassing line 150 may be configured to discharge bubbles generated in the coolant passing through the first branch line 120 into the reservoir tank 16 to maintain a pressure balance between the coolant line 11 and the battery coolant line 101, or may allow bubbles generated and collected in the coolant circulating in the coolant line 11 to flow into the first branch line 120. On the other hand, in the air conditioner 20, the refrigerant may pass through the compressor 31 and the internal condenser 23 along the refrigerant line 21, and then, through the operation of the integrated control valve 34, some of the refrigerant may flow into the first connecting line 111 and the remainder of the refrigerant may flow into the evaporator 27.

At the same time, the integrated control valve 34 may close the refrigerant line 21 connected to the first and second condensers 35 and 37. The refrigerant flowing into the first connecting line 111 may flow to the first connecting line 111 connected to the first chiller 110 by the operation of the refrigerant valve 117. At the same time, the second connecting line 115 may be closed by the operation of the refrigerant valve 117, thus the flow of the refrigerant may be stopped. Particularly, the integrated control valve 34 may allow the refrigerant of an expanded state to flow into the first connecting line 111. Accordingly, some of the refrigerant discharged from the internal condenser 23 may be expanded through the operation of the integrated control valve 34 to enter a low-temperature and low-pressure state, and may flow into the first chiller 110 connected to the first connecting line 111.

Thereafter, the refrigerant flowing into the first chiller 110 may be heat-exchanged with the coolant and may flow into the accumulator 33 through the first connecting line 111. In other words, the coolant having an increased temperature while cooling the battery module (B) may be cooled through the heat-exchange with the low-temperature and low-pressure refrigerant inside the first chiller 110. The cooled coolant may be supplied again to the battery module B through the battery coolant line 101. Accordingly, the battery B may be efficiently cooled by the coolant circulated in the battery coolant line 101 while the operation as described above is repeated.

The remaining refrigerant discharged from the internal condenser 23 may sequentially pass through the sub-heat exchanger 41, the expansion valve 39, the evaporator 27, the accumulator 33, the compressor 31, and the internal condenser 23 along the refrigerant line 21 from the integrated control valve 34. In other words, the remaining refrigerant discharged from the integrated control valve 34 may flow into the evaporator 27 in an expanded state in the expansion valve 39. The sub-heat exchanger 41 may further condense the refrigerant passing through the integrated control valve 34 through the heat-exchange with the low-temperature refrigerant discharged from the evaporator 27 to flow into the expansion valve 39.

In this state, the opening/closing door 29 may be opened to allow the outside air flowing into the HVAC module 22 to pass through the evaporator 27 to pass through the internal condenser 23. Accordingly, the outside air flowing into the HVAC module 22 may be dehumidified by the low-temperature refrigerant flowing into the evaporator 27 while passing through the evaporator 27. Thereafter, the outside air may be converted into a high-temperature state while passing through the internal condenser 23 and may flow into the interior of the vehicle through the selectively operating internal heater 25, thereby heating/dehumidifying the interior of the vehicle.

The present exemplary embodiment in which the waste heat of the electrical equipment 15 is recovered in the heating mode of the vehicle is exemplarily described, but the present invention is not limited thereto, and all of the waste heat generated in the electrical equipment 15 and the battery module B may be recovered in the heating mode or the heating/dehumidifying mode. In addition, when it is required to increase the temperature of the battery module B, the heater 105 may be turned on while the temperature of the battery module B is increased, and thus, the coolant circulated in the battery coolant line 101 may be heated to flow into the battery module B.

Accordingly, when the heat pump system 100 for the vehicle according to the exemplary embodiment of the present invention described above is applied, it may be possible to increase or decrease the temperature of the battery module B according to the modes of the vehicle using the first chiller 110 in which the coolant and the refrigerant are heat-exchanged in the electric vehicle or hybrid vehicle, thereby simplifying the system therefor. In addition, the battery module B may be efficiently heated and cooled according to the mode of the vehicle, thus the battery module B may operate in an optimal performance state, and the total mileage of the vehicle may be increased by efficiently managing the battery module B.

In addition, according to the exemplary embodiment of the present invention, it may be possible to reduce the number of valves for adjusting the flow of the refrigerant by applying the integrated control valve 34 for adjusting the flow of the refrigerant. Further, the heat pump system 1 according to the exemplary embodiment of the present invention may improve heating efficiency by using the second chiller 113 that selectively collects the waste heat of the electrical equipment 15 and of the battery module B. Moreover, according to the heat pump system for the vehicle of the exemplary embodiment of the present invention, by simplifying the entire system related thereto, it may be possible to reduce manufacturing costs and weight, and to improve space utilization.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A heat pump system for a vehicle, comprising:
a battery coolant line connected to a battery module and a coolant flows in the battery coolant line;
a cooling device having a radiator and a first water pump connected to a coolant line and the cooling device is configured to circulate the coolant in the coolant line to cool electrical equipment, wherein the cooling device is selectively connected to the battery coolant line via a first valve;
a first chiller disposed in the battery coolant line, to be connected to a refrigerant line of an air conditioner via a first connecting line, and the first chiller is configured to adjust a temperature of the coolant by selectively exchanging heat between the coolant and a refrigerant flowing into the first chiller;
a second chiller selectively connected to the coolant line via a second valve and selectively connected to the refrigerant line via a second connecting line, and the second chiller is configured to increase a temperature of the coolant by selectively exchanging heat between the coolant and the refrigerant flowing into the second chiller; and
an integrated control valve connected to the refrigerant line, the first connecting line, and the second connecting line to adjust a flow direction of the refrigerant circulated in the air conditioner and the integrated control valve is configured to selectively expand the refrigerant passing through the inside of the integrated control valve.

2. The heat pump system for a vehicle of claim 1, wherein the air conditioner includes:
a heating ventilation air conditioner (HVAC) connected to the air conditioner via the refrigerant line and an opening/closing door is disposed inside the HVAC to cause outside air passing through an evaporator selectively to flow into an internal condenser based on cooling, heating, and heating/dehumidifying modes of the vehicle;
a compressor connected between the evaporator and the internal condenser via the refrigerant line;

an accumulator disposed in the refrigerant line between the compressor and the evaporator;

a first condenser connected to the internal condenser via the refrigerant line and disposed inside of the radiator;

a second condenser connected to the first condenser via the refrigerant line and disposed in the front of the vehicle; and an expansion valve disposed in the refrigerant line connecting the second condenser and the evaporator.

3. The heat pump system for a vehicle of claim 2, wherein the refrigerant line that connects the internal condenser and the first condenser and the refrigerant line that connects the second condenser and the evaporator are respectively connected to the integrated control valve.

4. The heat pump system for a vehicle of claim 2, wherein the second connecting line is connected to the accumulator to supply the refrigerant passing through the second chiller to the accumulator.

5. The heat pump system for a vehicle of claim 2, wherein a sub-heat exchanger is disposed between the evaporator and the accumulator, and the refrigerant line that connects the integrated control valve and the expansion valve and the refrigerant line that connects the evaporator and the accumulator are respectively connected to the sub-heat exchanger.

6. The heat pump system for a vehicle of claim 5, wherein the sub-heat exchanger is a dual pipe heat exchanger.

7. The heat pump system for a vehicle of claim 5, wherein the sub-heat exchanger further condenses the refrigerant condensed in the second condenser through heat-exchange with a low-temperature refrigerant discharged from the evaporator to flow into the expansion valve.

8. The heat pump system for a vehicle of claim 2, wherein when the battery module is cooled using the refrigerant, the integrated control valve expands the refrigerant supplied from the second condenser through the refrigerant line and then discharges the refrigerant to the first connecting line to allow the refrigerant to flow into the first chiller.

9. The heat pump system for a vehicle of claim 2, wherein
the first valve is disposed between the radiator and the first chiller to selectively connect the coolant line connected to the electrical equipment and the battery coolant line connected to the battery module,
a first branch line is disposed in the battery coolant line, wherein the first branch line is connected to the battery coolant line through the first valve and selectively connects the first chiller and the battery module according to an operation of the first valve,
a third valve selectively connecting the battery coolant line is disposed in the coolant line and a coolant discharged from the radiator flows into the coolant line,
a second branch line connecting the radiator and the electrical equipment via the third valve is disposed in the coolant line connecting between the electrical equipment and the first valve,
the second valve is disposed in the refrigerant line between the electrical equipment and the radiator, and
a third branch line that is selectively connected to the coolant line via the second valve and configured to circulate a coolant passing through the electrical equipment to the coolant line connected thereto through the second valve without passing through the radiator.

10. The heat pump system for a vehicle of claim 9, wherein when the battery module is cooled, the first valve and the third valve block connection of the refrigerant line and the battery coolant line, and open the first and second branch lines.

11. The heat pump system for a vehicle of claim 9, wherein in the heating mode or the heating/dehumidifying mode of the vehicle, the third branch line is opened through an operation of the second valve.

12. The heat pump system for a vehicle of claim 9, wherein a reservoir tank is disposed in the refrigerant line between the radiator and the third valve, and the reservoir tank is connected to the third branch line, and is connected to the first branch line via a degassing line.

13. The heat pump system for a vehicle of claim 12, wherein the degassing line is configured to discharge bubbles generated in a coolant passing through the first branch line into the reservoir tank to maintain a pressure balance between the coolant line and the battery coolant line, or allow bubbles generated and collected in the coolant circulating in the coolant line to flow into the first branch line.

14. The heat pump system for a vehicle of claim 9, wherein the second chiller is disposed in the third branch line, and is selectively connected to the coolant line according to an operation of the second valve to recover waste heat generated from the electrical equipment or from the electrical equipment and the battery module in the heating mode of the vehicle.

15. The heat pump system for a vehicle of claim 2, wherein the first condenser is a water-cooled heat exchanger and the second condenser is an air-cooled heat exchanger.

16. The heat pump system for a vehicle of claim 1, wherein the second connecting line is selectively connected to the first connecting line connected to the integrated control valve through a refrigerant valve.

17. The heat pump system for a vehicle of claim 16, wherein when the battery module is cooled using the refrigerant regardless of the modes of the vehicle, the refrigerant valve closes the second connecting line, and when it is not required for the battery module to be cooled in the heating mode or the heating/dehumidifying mode of the vehicle, the refrigerant valve closes the first connecting line connected to the first chiller and opens the second connecting line connected to the second chiller.

18. The heat pump system for a vehicle of claim 1, wherein
a second water pump is disposed in the battery coolant line between the first chiller and the battery module,
a heater is disposed in the battery coolant line between the battery module and the first chiller, and
the heater is turned on while a temperature of the battery module is increased to heat the coolant circulated in the battery coolant line to flow into the battery module.

* * * * *